(12) United States Patent
Fairy et al.

(10) Patent No.: US 11,920,736 B2
(45) Date of Patent: Mar. 5, 2024

(54) METHOD AND SYSTEM FOR FILLING TANKS OF HYDROGEN-FUELED VEHICLES

(71) Applicant: L'Air Liquide, Societe Anonyme pour l'Etude et l'Exploitation des Procedes Georges Claude, Paris (FR)

(72) Inventors: Vincent Fairy, Houston, TX (US); Anh Thao Thieu, Jouy-en-Josas (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/945,992

(22) Filed: Sep. 15, 2022

(65) Prior Publication Data

US 2023/0213148 A1    Jul. 6, 2023

Related U.S. Application Data

(60) Provisional application No. 63/295,764, filed on Dec. 31, 2021.

(51) Int. Cl.
*F17C 5/04* (2006.01)

(52) U.S. Cl.
CPC .......... *F17C 5/04* (2013.01); *F17C 2221/012* (2013.01); *F17C 2227/0135* (2013.01);
(Continued)

(58) Field of Classification Search
CPC ...... F17C 5/007; F17C 5/04; F17C 2221/012; F17C 2265/03; F17C 2205/0326; F17C 2223/0153; F17C 2227/0135; F17C 2227/0302; F17C 2227/0337; F17C 2250/03; F17C 2250/043;
(Continued)

(56) References Cited

U.S. PATENT DOCUMENTS

| | | | |
|---|---|---|---|
| 9,528,657 B2 | 12/2016 | Allidieres et al. | |
| 2013/0125568 A1* | 5/2013 | Chalk | F04D 29/584 62/126 |

(Continued)

FOREIGN PATENT DOCUMENTS

| | | |
|---|---|---|
| WO | WO 2018/012779 | 1/2018 |
| WO | WO 2021/138169 | 7/2021 |

OTHER PUBLICATIONS

Daney, et al., "Hydrogen-fuelled vehicle station," Advances in Cryogenic Engineering, vol. 41, 1996.

(Continued)

*Primary Examiner* — Timothy P. Kelly
*Assistant Examiner* — Christopher M Afful
(74) *Attorney, Agent, or Firm* — Justin K. Murray (57) ABSTRACT

Heat is transferred from a flow of liquid hydrogen to a flow of a heat transfer fluid at a first heat exchanger to produce a warmed flow of pressurized hydrogen and a cooled flow of heat transfer fluid. Heat is also transferred at a second heat exchanger, to the cooled flow of heat transfer fluid, from a flow of pressurized hydrogen that is derived from one or more buffer vessels filled by the warmed flow of pressurized hydrogen and/or the warmed flow of pressurized hydrogen from the first exchanger to produce a cooled flow of pressurized hydrogen that is used to fill tanks of fuel cell electric vehicles.

13 Claims, 7 Drawing Sheets

(52) U.S. Cl.
CPC ............... *F17C 2227/0313* (2013.01); *F17C 2227/0365* (2013.01); *F17C 2250/01* (2013.01); *F17C 2250/043* (2013.01); *F17C 2250/0439* (2013.01); *F17C 2265/065* (2013.01)

(58) Field of Classification Search
CPC ...... F17C 2250/0439; F17C 2250/0626; F17C 2250/0636; F17C 2270/0184
USPC .......................................................... 141/11
See application file for complete search history.

(56) References Cited

U.S. PATENT DOCUMENTS

| | | | | |
|---|---|---|---|---|
| 2013/0291567 | A1* | 11/2013 | Bohra | F17C 5/06 62/48.1 |
| 2017/0254479 | A1* | 9/2017 | Petersen | F17C 5/06 |
| 2018/0306381 | A1* | 10/2018 | Fujisawa | B67D 7/78 |
| 2019/0331298 | A1* | 10/2019 | Thor | F17C 5/06 |
| 2020/0095113 | A1* | 3/2020 | Crispel | B67D 7/82 |
| 2021/0198095 | A1 | 7/2021 | Fairy | |

OTHER PUBLICATIONS

Raman, et al., "A rapid fill hydrogen fuel station for fuel cell buses," 12th World Energy Conference Hydrogen Energy Progress 2, pp. 1629-1642.

* cited by examiner

METHOD AND SYSTEM FOR FILLING TANKS OF HYDROGEN-FUELED VEHICLES

CROSS-REFERENCE TO RELATED APPLICATIONS

This application claims the benefit of priority under 35 U.S.C. § 119 (e) to U.S. Provisional Patent Application No. 63/295,764, filed Dec. 31, 2021, the entire contents of which are incorporated herein by reference.

BACKGROUND

Field of the Invention

The invention relates to a method and device for filling pressurized hydrogen gas tanks.

More particularly, the invention relates to a device for filling the tanks of fuel cell electric vehicles (FCEV) with hydrogen, the device comprising a liquefied gas source, a transfer circuit in downstream fluid communication with the liquefied gas source and comprising at least one downstream end adapted and configured to be removably connected to a vehicle hydrogen tank to be filled.

Related Art

In order to refuel a fuel cell electric vehicle with high pressure, gaseous hydrogen in a manner consistent with Society of Automotive Engineers (SAE) standard J2601, the temperature of the gaseous hydrogen just upstream of the fuel tank must be controlled to within a relatively narrow, and cold, temperature window, such as between $-17.5°$ C. and $-40°$ C. Also, the pressure ramp rate of the gaseous hydrogen must be controlled according to various physical properties, such as the ambient temperature, the fuel tank category, and the temperature and flow rate of the gaseous hydrogen just upstream of the fuel tank. A pressure control valve, often located just upstream of a heat exchanger for cooling the hydrogen, is used to carry out control of the pressure ramp rate.

Hydrogen gas refuelling stations using liquid hydrogen sources are known.

This type of refuelling station makes it possible to use refrigeration from the liquid hydrogen to produce pre-cooled pressurized hydrogen gas for rapid filling without experiencing an excessive increase in the temperature of the gas in the tank during filling.

For example, Daney, et al. proposed a conceptual refilling station that uses a vaporizer for providing ambient temperature, high pressure gaseous hydrogen that is subsequently cooled prior to being fed to the vehicle tank. Daney, et al., "Hydrogen-fuelled vehicle fuelling station", Advances in Cryogenic Engineering, vol 41, 1996.

Another such station implemented at an urban bus refilling station utilizes a vaporizer that transfers heat from the ambient air to the pumped flow of liquid hydrogen to provide a flow of high pressure, gaseous hydrogen to the vehicle tank. Raman, et al. "A rapid fill hydrogen fuel station for fuel cell buses", 12th World Energy conference Hydrogen energy Progress 2, pp 1629-1642.

One type of hydrogen gas refuelling station that uses a liquid hydrogen source is disclosed by US 2020-0095113 A1. During a vehicle fill mode, a stream of vaporized hydrogen and a stream of liquid hydrogen are mixed using control valves to produce a gaseous hydrogen stream (derived from the mixing) having a predetermined low temperature that is desirable for fast fills. If enough gaseous hydrogen is available from one or more buffer vessels, the gaseous hydrogen used to fill a given vehicle is produced by mixing a stream of the liquid hydrogen and a stream of gaseous hydrogen from the buffer(s). If the requirements of the fill exceed the availability of gaseous hydrogen stored in one or more buffer containers, the stream of gaseous hydrogen is produced by feeding a stream of liquid hydrogen to a vaporizer. In between vehicle fills, the buffer vessel(s) is refilled with gaseous hydrogen produced by mixing the stream of liquid hydrogen and the stream of gaseous hydrogen from the vaporizer. While the temperature of the hydrogen in the buffer vessel(s) immediately following the fill may be colder than ambient, heat leak into the buffer vessel(s) result in heating of the hydrogen, even to ambient temperature. This necessitates the cooling of the gaseous hydrogen to relatively low temperatures (e.g., $-40°$ C.) prior to its entering the vehicle tank so that a fast fill may be achieved.

The cost of gaseous hydrogen that has been used to fill a vehicle (at hydrogen refuelling stations utilizing an on-site liquid hydrogen source) is made up of many cost components, including the production of hydrogen, the distribution of liquid hydrogen, the storage of liquid hydrogen, the vaporization of the liquid hydrogen, and the cooling of the gaseous hydrogen. While the scheme disclosed by US 2020-0095113 is quite satisfactory, there is still a need for a method and system that has increased efficiency in terms of the overall cost of gaseous hydrogen used to fill vehicle tanks.

SUMMARY OF THE INVENTION

An aim of the invention is to overcome all or some of the prior art disadvantages stated above.

There is disclosed a system for filling tanks of fuel cell electric vehicles with pressurized hydrogen, comprising: a liquid hydrogen storage vessel; a liquid hydrogen pump; a main HTF surge vessel; a main heat transfer fluid pump; first and second heat exchangers; at least one buffer vessel; and a filling circuit. The liquid hydrogen pump is in downstream flow communication from the storage vessel and is adapted and configured to receive a stream of liquid hydrogen from the storage vessel and pump and pressurize the liquid hydrogen stream to produce a stream of pressurized hydrogen. At least one buffer vessel is adapted and configured to receive the stream of pressurized hydrogen produced by the liquid hydrogen pump and store pressurized hydrogen until a vehicle tank fill is requested. The filling circuit is in parallel downstream flow communication from said at least one buffer vessel. The filling circuit comprises at least one filling dispenser that is adapted and configured to engage with a fuel cell electric vehicle so as to allow a tank thereof be filled with pressurized hydrogen. A heat exchange circuit is formed by, in flow order, the surge vessel, the main heat transfer fluid pump, the first heat exchanger, and the second heat exchanger. The first heat exchanger circuit is adapted and configured to circulate a main stream of a HTF from said surge vessel through a cooling circuit of said first heat exchanger, through a warming circuit of said second heat exchanger, and back to said surge vessel. The first heat exchanger is adapted and configured to heat, in a first warming circuit thereof, a pressurized stream of hydrogen from said liquid hydrogen pump and cool, in a cooling circuit thereof, the main HTF stream. The second heat exchanger is adapted and configured to cool, in a cooling circuit thereof, a pressurized stream of hydrogen from said at least one buffer vessel, and heat, in a heating circuit thereof, the main HTF stream.

There is also disclosed a method for filling tanks of fuel cell electric vehicles with pressurized hydrogen, comprising the steps of: providing the above-disclosed system; pumping a stream of liquid hydrogen from said storage vessel, with said liquid hydrogen pump, to produce a stream of pressurized hydrogen; warming said stream of pressurized hydrogen in said warming circuit of said first heat exchanger to produce a warmed stream of pressurized hydrogen; filling one or more of said at least one buffer vessel with said warmed stream of pressurized hydrogen; pumping, with said main HTF pump, a stream of a main HTF from said surge vessel; cooling said pumped stream of the main HTF in said cooling circuit of said first heat exchanger to produce a cooled stream of the main HTF; warming said cooled stream of the main HTF in said warming circuit of said second heat exchanger to produce a warmed stream of the main HTF; returning said warmed stream of the main HTF to said surge vessel; and in response to a request to fill a tank of a fuel cell electric vehicle with pressurized hydrogen, feeding a stream of pressurized hydrogen from said at least one buffer vessel to said second heat exchanger, cooling said fed stream of pressurized hydrogen in said cooling circuit of said second heat exchanger, and filling the tank.

The system and/or method may include one or more of the following aspects:

- the at least one filling dispenser comprises first and second filling dispensers each one of which is adapted and configured to engage with a respective fuel cell electric vehicle so as to allow an associated tank thereof be filled with pressurized hydrogen, the filling circuit branches into a first split-stream adapted and configured to feed a pressurized stream of hydrogen from the at least one buffer vessel to the first filling dispenser and a second split-stream adapted and configured to feed a pressurized stream of hydrogen from the at least one buffer vessel to the second filling dispenser.
- an auxiliary heat exchanger, that comprises a warming circuit, is in flow communication between said warming circuit of the first heat exchanger and the at least one buffer vessel and a cooling circuit; an auxiliary heat transfer circuit being formed from the cooling circuit of the auxiliary heat exchanger and an auxiliary heat transfer pump; the auxiliary heat transfer circuit is adapted and configured to circulate an auxiliary heat transfer fluid from the auxiliary heat transfer pump, through the cooling circuit of said auxiliary heat transfer circuit and back to the auxiliary heat transfer pump; and, optionally, the auxiliary heat exchanger is a tube-in-tube heat exchanger comprising an inner tube concentrically disposed within an outer tube, the warming circuit of the auxiliary heat exchanger being said inner tube and said cooling circuit of said auxiliary heat exchanger being said outer tube.
- a pressure building circuit is in flow communication between a liquid hydrogen storage area of the storage vessel and a headspace of the storage vessel, the pressure building circuit being adapted and configured to receive a stream of liquid hydrogen from the liquid hydrogen space of the storage vessel, vaporize, in a second warming circuit of the first heat exchanger, the stream of liquid hydrogen received from the storage vessel through heat exchange with a mass of the first heat exchanger, and return the vaporized liquid hydrogen to the headspace so as to build a pressure therein.
- a boil-off gas venting circuit is in flow communication between a headspace of the storage vessel and a an ambient atmosphere of the system, the boil off gas venting circuit comprising a first end that is in downstream flow communication with the headspace, a second end that is selectively open to the ambient atmosphere, and a second warming circuit of the first heat exchanger in between the first and second ends, the boil off gas vent circuit being adapted and configured to receive boil off gas from the headspace, warm the received boil off gas in the second warming circuit through heat exchange with a mass of the first heat exchanger, and vent the warmed boil off gas to the ambient atmosphere via the second end.
- a main HTF line is in fluid communication between said the HTF pump and the cooling circuit of the first heat exchanger; a main HTF bypass loop has a first end in downstream fluid communication with the main HTF line, a second end in upstream fluid communication with the main HTF line, and a heat exchanger section therebetween; and a fan heater is adapted and configured to blow ambient air upon the heat exchange section to warm a pumped flow of the main HTF before the pumped flow of the main HTF is cooled at the first heat exchanger.
- the first heat exchanger comprises a mass of metal formed by high-temperature casting in liquid form around the warming and cooling circuits.
- a pressure sensor and a temperature sensor are each disposed in the filling circuit that are adapted and configured to measure a pressure and a temperature, respectively, of the cooled pressurized stream received from the second heat exchanger; a pressure control valve is disposed in the filling circuit that is adapted and configured to control a pressure of the stream of cooled pressurized hydrogen used to fill a tank of a fuel cell electric vehicle; and a controller is adapted and configured to control operation of the pressure control valve based upon the pressure and temperature measured by the pressure and temperature sensors.
- an auxiliary HTF is pumped in an auxiliary heat exchange circuit with an auxiliary heat transfer pump to produce a recirculating flow of the auxiliary HTF; and the stream of pressurized hydrogen from the first heat exchanger is warmed in the warming circuit of the auxiliary heat exchanger, and the recirculating flow of the auxiliary HTF is cooled, in the cooling circuit of the auxiliary heat exchanger, through heat exchange between the stream of pressurized hydrogen and the recirculating flow of the auxiliary HTF.
- a stream of liquid hydrogen from the storage vessel is fed to a second warming circuit of the first heat exchanger; the fed stream of liquid hydrogen is vaporized in the second warming circuit of the first heat exchanger through heat exchange with the first heat exchanger to produce a stream of vaporized liquid hydrogen; and the stream of vaporized liquid hydrogen is returned to a headspace of the storage vessel thereby increasing a pressure thereof.
- a stream of gaseous hydrogen is fed from a headspace of the storage vessel to a second warming circuit of the first heat exchanger, the fed stream of gaseous hydrogen is warmed in a second warming circuit of the first heat exchanger, and the warmed gaseous hydrogen is vented to the ambient atmosphere.
- a main HTF line is in fluid communication between the main HTF pump and the cooling circuit of the first heat exchanger; a main HTF bypass loop has a first end in downstream fluid communication with the main HTF line, a second end in upstream fluid communication with the main HTF line, and a heat exchanger section therebetween; a fan heater is adapted and configured to blow ambient air upon the heat exchange section to warm a pumped flow of the main HTF before the pumped flow of the main HTF is cooled at the first heat exchanger; and at least a portion of the pumped stream of the main HTF is warmed in the heat exchanger section of the main HTF bypass loop by blowing ambient air upon the heat exchanger section with the fan heater.

a pressure control valve is disposed in said filling circuit that is adapted and configured to control a pressure of the stream of cooled pressurized hydrogen used to fill a tank of a fuel cell electric vehicle, a pressure sensor and a temperature sensor are disposed in the filling circuit that are adapted and configured to measure a pressure and a temperature, respectively, of the cooled pressurized stream received from the second heat exchanger, using said controller, operation of the pressure control valve is controlled based upon the pressure and temperature measured by the pressure and temperature sensors.

an auxiliary heat exchanger is adapted and configured to further warm, in a warming circuit thereof, the pressurized hydrogen exiting the first heat exchanger; the auxiliary heat exchanger is in flow communication between the first heat exchanger and the one or more buffer vessels; and the pressurized hydrogen exiting the first heat exchanger is warmed in the auxiliary heat exchanger through heat exchange with an auxiliary HTF flowing in an auxiliary heat exchanger circuit that includes a cooling circuit of the auxiliary heat exchanger.

BRIEF DESCRIPTION OF THE FIGURES

Other characteristic features and advantages will emerge upon reading the following description, with reference to the figures in which.

LIST OF REFERENCE CHARACTERS liquid hydrogen source 1
liquid hydrogen feed line 3
liquid hydrogen pump 5
pressurized hydrogen stream 9
first heat exchanger 11
warmed pressurized hydrogen stream 13
auxiliary heat exchanger 15
further warmed pressurized hydrogen stream 17
buffer vessel 19
valve 21
pressurized gaseous hydrogen stream 23
first pressurized hydrogen sub stream 23'
second pressurized hydrogen sub stream 23"
three-way valve 24
second heat exchanger 25
first of two second heat exchangers 25'
second of two second heat exchangers 25"
pressure sensor 27
pressure sensor 27'
pressure sensor 27"
temperature sensor 29
temperature sensor 29
temperature sensor 29
filling dispenser 31
filling dispenser 31'
filling dispenser 31"
pressure control valve 33
fuel cell electric vehicle 35
fuel cell electric vehicle 35'
fuel cell electric vehicle 35"
surge vessel 37
stream of heat transfer fluid 39
main HTF pump 41
pumped stream of main HTF 43
temperature sensor 45
cooled stream of main HTF 47
auxiliary HTF pump 49
cooling device 51
temperature sensor 52
first split-stream of main HTF 53'
second split-stream of main HTF 53"
three-way flow control valve 55
flow of cooled main HTF 56
flow of cooled main HTF 56'
bypass flow of cooled main HTF 56"
warmed second stream of heat transfer fluid 57
warmed first split-stream of heat transfer fluid 57'
warmed second split-stream of heat transfer fluid 57"
bypass flow of cooled main HTF 58
first bypass flow of cooled main HTF 58'
second bypass flow of cooled main HTF 58"
three-way flow control valve 67
auxiliary heat transfer fluid pump 71
pumped stream of auxiliary heat transfer fluid 73
warmed stream of auxiliary heat transfer fluid 75
pressure building circuit liquid hydrogen feed line 77
control valve 79
temperature sensor 81
gaseous hydrogen line 83
headspace feed line 85
control valve 87
vent valve 89
vent 91
gaseous hydrogen return line 93
3-way flow control valve 95'
3-way flow control valve 95"
main HTF bypass flow 97
fan heater 99

DETAILED DESCRIPTION OF THE INVENTION

In conventional filling methods utilizing liquid hydrogen sources, a stream of liquid hydrogen is pumped to very high pressures above its critical pressure. The resulting very cold, pressurized fluid is then heated at a "vaporizer" in contact with the ambient atmosphere. We used the term "vaporizer" broadly because the cold, pressurized fluid may be in a dense liquid state (above its critical pressure) or in the supercritical state and it is even conceivable that it might be in the gaseous state. The available refrigeration (i.e., frigories or negative heat) of the cold, pressurized fluid in conventional techniques is thus lost to the ambient atmosphere. Depending upon the flow rate demanded at the dispenser(s) used to fill one or more FCEV tanks, the pressurized fluid from the vaporizer may be used to directly fill the tanks(s) and optionally supplemented with amounts of hydrogen from one or more buffer vessels or it may instead by stored in the one or more buffer vessels and later used to accomplish a fill of one or more tanks. Given enough time and due to heat leak at the one or more buffer vessels, the temperature of the heated pressurized fluid, which is often still at very low temperatures, is increased to ambient temperature. In order to efficiently fill the one or more tanks, such ambient temperature fluid must be cooled with an external refrigeration source so that the Joule-Thomson heating (at temperatures above the inversion temperature of hydrogen) may be accommodated without over pressurizing the tank(s).

In order to avoid wasting the refrigeration available from the pressurized hydrogen at the vaporizer that is realized with conventional techniques, that refrigeration frigories or negative heat) is instead captured through heat exchange with a main heat transfer fluid (main HTF) in practice of the invention. Those captured frigories are then used to cool the pressurized hydrogen that is used to fill the vehicle tank(s) through heat exchange between the main HTF and the pressurized hydrogen. This provides increased efficiency in comparison to conventional techniques that require an external source of refrigeration for cool the pressurized hydrogen.

In the invention, a heat exchange circuit includes a surge vessel, a main HTF pump, a cooling circuit of a first heat exchanger, and a warming circuit of a second heat exchanger. Each of the first and second heat exchangers includes a warming circuit and a cooling circuit. Liquid hydrogen is pumped with a liquid hydrogen pump and fed to the warming circuit of the first heat exchanger while the main HTF is pumped with a main HTF pump from a surge vessel to the cooling circuit of the first heat exchanger. At the first heat exchanger, the pumped hydrogen is warmed through heat exchange with the pumped main HTF to produced warmed pressurized hydrogen and cooled main HTF. Pressurized hydrogen from either one or more buffer vessels or derived from the warmed pressurized hydrogen is fed to the cooling circuit of the second heat exchanger while the cooled main HTF is fed to the warming circuit of the second heat exchanger. At the second heat exchanger, the warmed pressurized hydrogen is cooled through heat exchanger with the cooled main HTF to produce cooled pressurized hydrogen that is used to fill one more tanks of a FCEV and warmed main HTF. The warmed main HTF is returned to the surge vessel.

Optionally, one or more temperature control schemes may be utilized in practice of the invention.

In order to ensure that the main HTF is not over-cooled through heat transfer with the mass of the first heat exchanger and the frigories of the pumped liquid hydrogen, at least a portion of the flow of the pumped main HTF may be warmed, as necessary, in a bypass loop before it is directed to the cooling circuit of the first heat exchanger.

In order to ensure that a temperature of the pressurized hydrogen exiting the first heat exchanger is not too cold for the specifications of the one or more buffer vessels filled with the pressurized hydrogen, the pressurized hydrogen exiting the first heat exchanger may be further warmed in an auxiliary heat exchanger in flow communication between the first heat exchanger and the one or more buffer vessels. The In order to ensure that the first heat exchanger is not too warm when a request to filling one or more buffer vessels (with pressurized hydrogen from the first heat exchanger) is made, the mass of the first heat exchanger may be cooled down in one or both of two ways. First, a pressure building circuit of the storage vessel may extend through an additional cooling circuit of the first heat exchanger. In other words, the additional cooling circuit is used as the heat exchanger section of a typical pressure building circuit. Second, a boil-off gas vent line may extend through the additional cooling circuit of the first heat exchanger.

In order to ensure that pumped liquid hydrogen is not over-cooled at the first heat exchanger, it may be subsequently warmed through heat exchange with an auxiliary heat transfer fluid (auxiliary HTR) that flows through an auxiliary heat transfer circuit. Whether the auxiliary HTF and the main HTF is the same or different type of heat exchanger fluid, the heat exchange circuit through which the main HTF flows is separate from the auxiliary heat exchange circuit.

In order to ensure that the pressurized hydrogen used to fill the tank of a FCEV is sufficiently cold, a flow control valve may be used to split a flow of the cooled main HTF from the first heat exchanger into a stream that flows through the warming circuit of the second heat exchanger and a stream that bypasses that warming circuit. If more cooling is needed, more of the flow of the cooled main HTF is allowed to flow through the cooling circuit of the second heat exchanger and less bypasses the second heat exchanger. If less cooling is needed, less of that flow is allowed to flow through the cooling circuit and more of it is allowed to bypass the second heat exchanger.

We will now describe particular embodiments.

Figure 1:
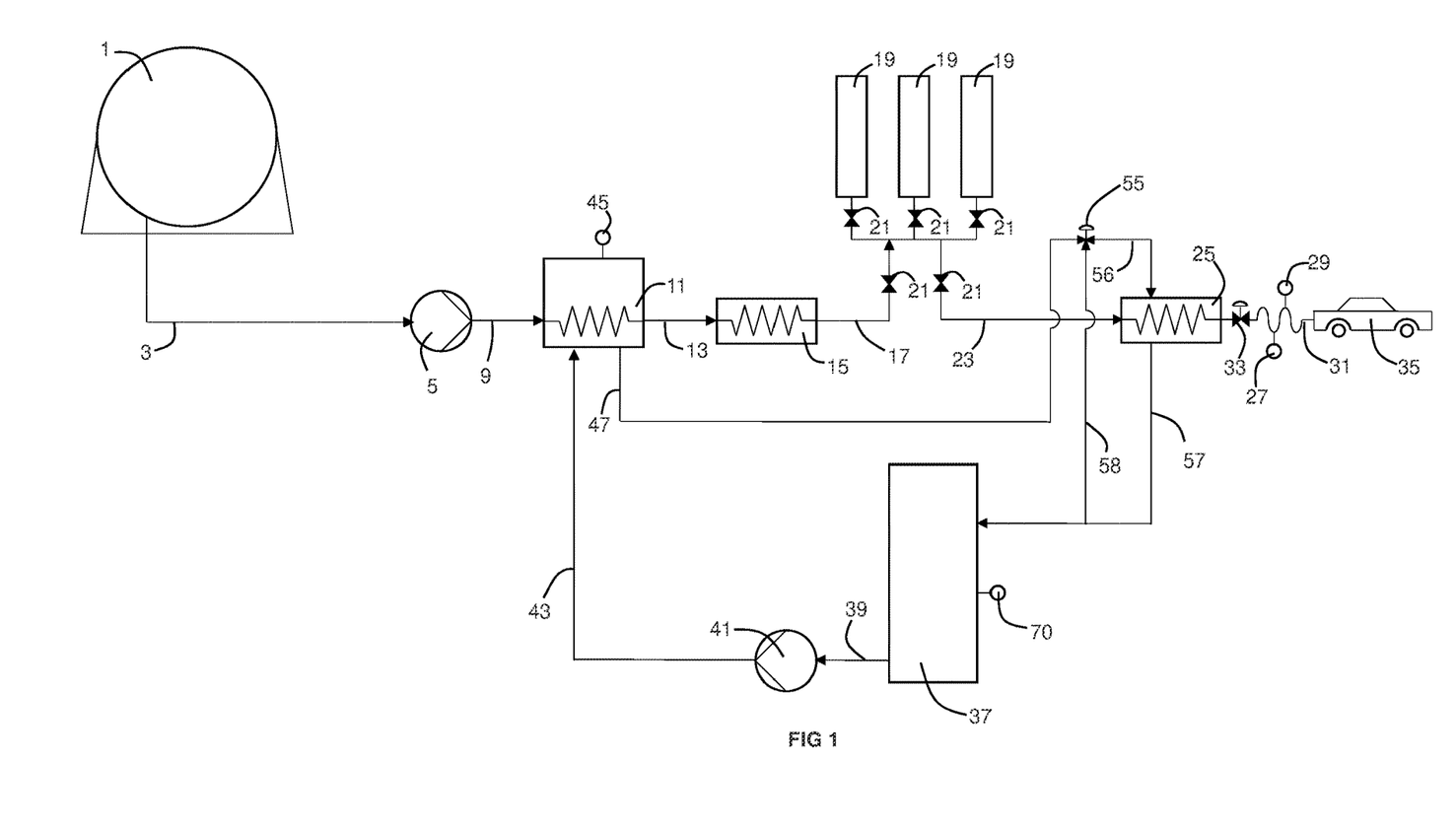
FIG. 1 is a schematic view of an embodiment of the inventive station and method of the invention.

As best shown in FIG. 1, a stream of liquid hydrogen 3 from a liquid hydrogen storage vessel 1 is pumped with a liquid hydrogen pump 5 to produce a stream of pressurized hydrogen 9. The stream of pressurized hydrogen 9 is fed to a first warming circuit of a first heat exchanger 11 to produce a warmed stream of pressurized hydrogen 13. The warmed stream of pressurized hydrogen 13 is fed via a circuit 17 and a set of valves 21 to one or more buffer vessels 19. Optionally, the warmed stream of pressurized hydrogen 13 can be further warmed in a warming circuit of an auxiliary heat exchanger 15 prior to being fed to the one of more buffer vessels 19.

A stream of main HTF 39 is pumped with a main HTF pump 41 to produce a pumped stream of main HTF 43. The pumped stream of main HTF 43 is fed to a cooling circuit of the first heat exchanger 11 to produce a cooled stream of main HTF 47.

Optionally, a temperature representative of a temperature of the material that the first heat exchanger 11 is comprised of is measured with a temperature sensor 45. The temperature sensor 45 may measure a skin temperature of the first heat exchanger 11. Alternatively, it may be embedded in the material that the first heat exchanger 11 is made of. Alternatively, it may measure a temperature of the main HTF inside the first heat exchanger 11 or a temperature of the main HTF at an outlet of the cooling circuit of the first heat exchanger. A controller (such as a programmable logic controller or computer) controls a speed of the main HTF pump 41 (such as by increasing or decreasing the speed of a variable frequency drive of the pump 41) based upon the temperature measured by the temperature sensor 45 and a predetermined set point temperature or range of set point temperatures sought to be achieved.

The frigories from the pumped stream of liquid hydrogen 9 that were captured by the pumped stream of main HTF 43 are at least partially returned to the hydrogen that is used to fill the FCEV tanks. To achieve this, a flow of pressurized hydrogen 23 (from the one of more buffer vessels 19 via the set of valves 21) is fed to a cooling circuit of the second heat exchanger 25 where it is cooled through heat exchange with at least a portion of the cooled stream of main HTF 47 that is fed to a warming circuit of a second heat exchanger 25. The thus-cooled stream of pressurized hydrogen is used to fill the tank of a FCEV via a filling dispenser 31. The thus-warmed stream of main HTF 57 is subsequently returned to the surge vessel 37.

Optionally, a temperature of the hydrogen (that is used to fill the FCEV tank) is measured with a temperature sensor 29. A controller (such as a programmable logic controller or computer that is the same as or different from the one controlling the main HTF pump) controls three-way flow control valve 55 to allocate the flow of the cooled main HTF 23 between a flow of main HTF 56 fed to the warming circuit of the second heat exchanger 25 and a bypass flow of main HTF 58. This control is based upon the temperature measured by temperature sensor 29 and a predetermined set point temperature or range of set point temperatures sought to be achieved. The bypass flow of cooled main HTF 58 and warmed stream of main HTF 57 are combined and returned to the surge vessel 37.

Optionally, a pressure of the cooled pressurized hydrogen from the second heat exchanger 25 is controlled with a pressure control valve 33 based upon the temperature and pressure of the hydrogen (used to fill the tank of the FCEV 35) that is measured with temperature sensor 29 and a pressure sensor 27, respectively. The pressure control valve 33 is controlled by a controller (such as a programmable logic controller or computer) that is coded with a filing algorithm such as one that is consistent with the SAE standard J2601 for filling light duty vehicles.

Any type of heat exchanger known in the field of heat transfer involving cryogenic fluids may be used for the first heat exchanger 11. Typically, the first heat exchanger is a refrigeration hold-over medium such as that described in U.S. Pat. No. 9,528,657, the contents of which are incorporated by reference in their entirety. The refrigeration hold-over medium is made of a mass of metal such as aluminum, stainless steel, copper, or lead. It has a sufficiently high specific heat capacity and thermal conductivity, enabling it to easily transfer heat (accept frigories) and to store a satisfactory amount of refrigeration (frigories). More particularly; the refrigeration hold-over medium typically has a specific heat per unit mass (density X specific heat at constant pressure) of between 2000 and 4000 kJ/m$^3$K and a thermal conductivity of between 150 and 400 W/mK. Typically, the refrigeration hold-over medium is formed as a mass of metal formed by high-temperature casting in liquid form around the warming and cooling circuits in order to increase the thermal contact therebetween. The distance between adjacent portions of the warming and cooling circuits of the first heat exchanger 11 may be as low as 1 or more millimetres, preferably at least 5 mm. This allows an amount of mass in between the warming circuits that yields a satisfactorily high enough capacity for storage of frigories to be accepted by the pumped stream of main HTF 43.

Figure 2:
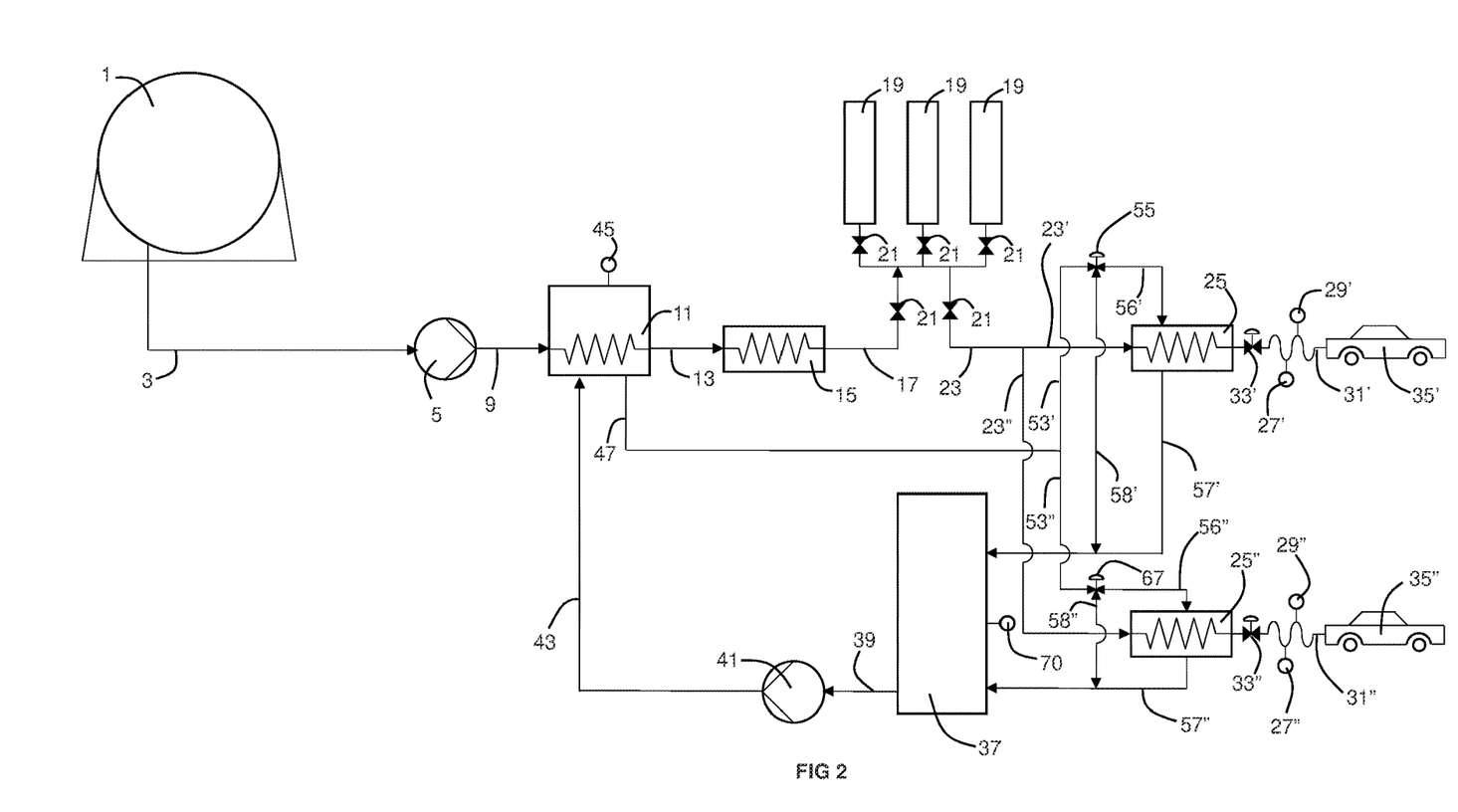
FIG. 2 is a schematic view of a variant of the station and method of FIG. 1.

As best illustrated in FIG. 2, the pressurized hydrogen stream 23 may be split into first and second pressurized hydrogen sub streams 23', 23" At the first of two second heat exchangers 25', the first pressurized hydrogen sub stream 23' is cooled in a cooling circuit thereof. Similarly, at the second of two second heat exchangers 25", the second pressurized hydrogen sub stream 23" is also cooled in cooling circuit thereof. The cooled stream of main HTF 47 is correspondingly split into first and second split-streams of main HTF 53', 53", respectively, with a three-way valve flow control 67 that is controlled with a controller (such as a programmable logic controller or computer that is the same as or different from the one controlling main HTF pump 41). After being cooled at a corresponding one of the two second heat exchangers 25', 25", the two flows of pressurized hydrogen derived from sub streams 23', 23" are used to fill corresponding tanks of FCEVs 35', 35".

Figure 6:
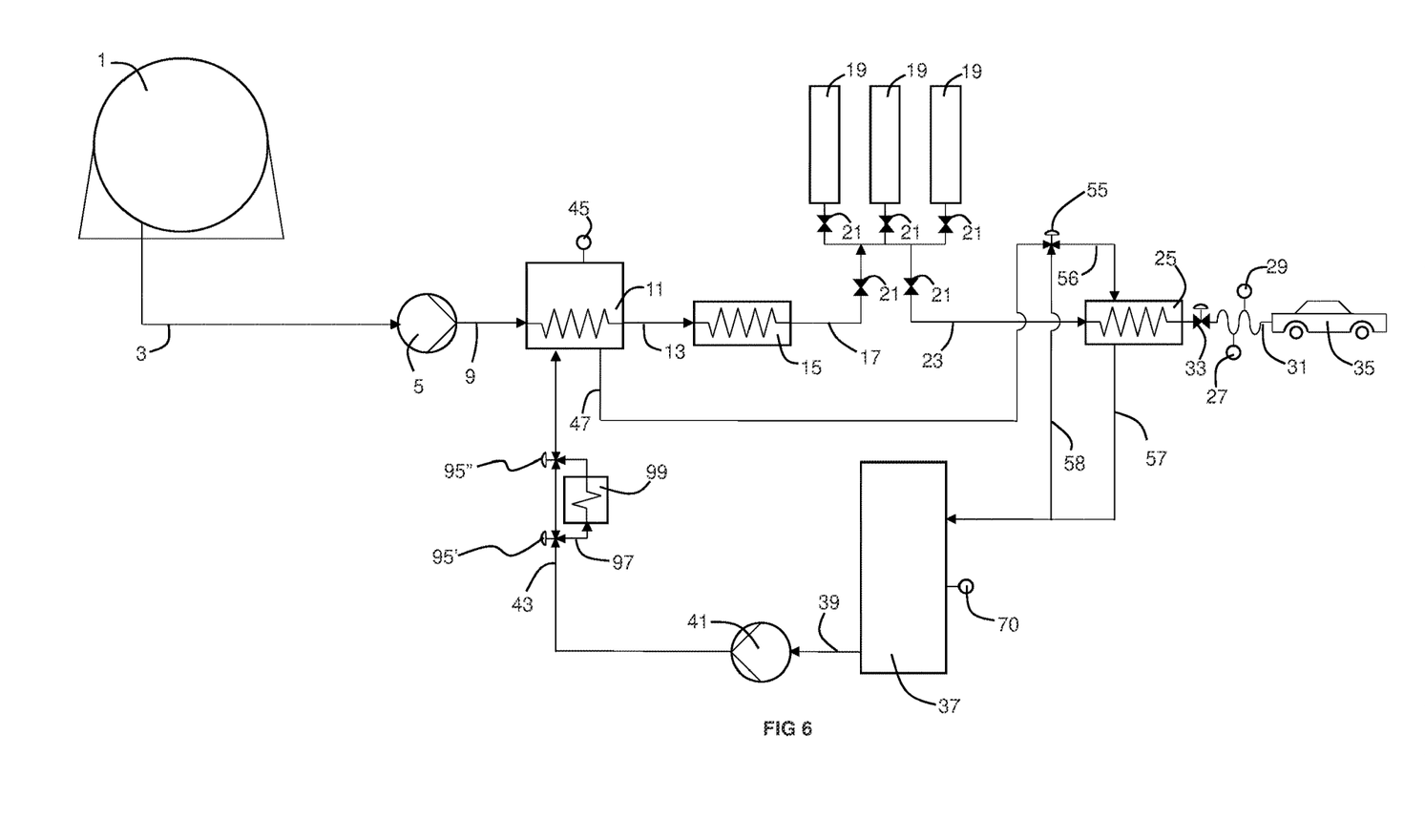
FIG. 6 is a schematic view of a variant of the station and method of FIG. 1.

The embodiment of FIGS. 2 and 6 may be used to simultaneously fill two tanks of FCEVs. For example, one of the buffer vessels 19 at one pressure may provide pressurized hydrogen used to fill the tank of the first FCEV 35' while another of the buffer vessels 19 at a different pressure may provide hydrogen used to fill the tank of the second FCEV 35". Skilled artisans will recognize that the illustration of the set of valves 21, one or more buffer vessels 19, and the first and second pressurized hydrogen sub streams 23', 23' is a simplification. The lines leading away from the buffer vessels 19 may be branched in order to achieve this simultaneous filling and need not be restricted to the simply illustrated scheme in which a single manifold handles a single flow from the buffer vessels 19.

Optionally, a temperature of the hydrogen (that is used to fill the FCEV tank) is measured with a temperature sensor 29' associated with a first FCEV 35' and a temperature of the hydrogen is measured with a temperature sensor 29" associated with a second FCEV 35". A controller (such as a programmable logic controller or computer that is the same as or different from the one controlling the main HTF pump) controls three-way flow control valve 55 to allocate the flow of the cooled main HTF 23 between a flow of main HTF 56 fed to the warming circuit of the second heat exchanger and a bypass flow of main HTF 58. This control is based upon the temperature measured by temperature sensor 29 and a predetermined set point temperature or range of set point temperatures sought to be achieved. The bypass flow of cooled main HTF 58 and warmed stream of main HTF 57 are combined and returned to the surge vessel 37.

Figure 3:
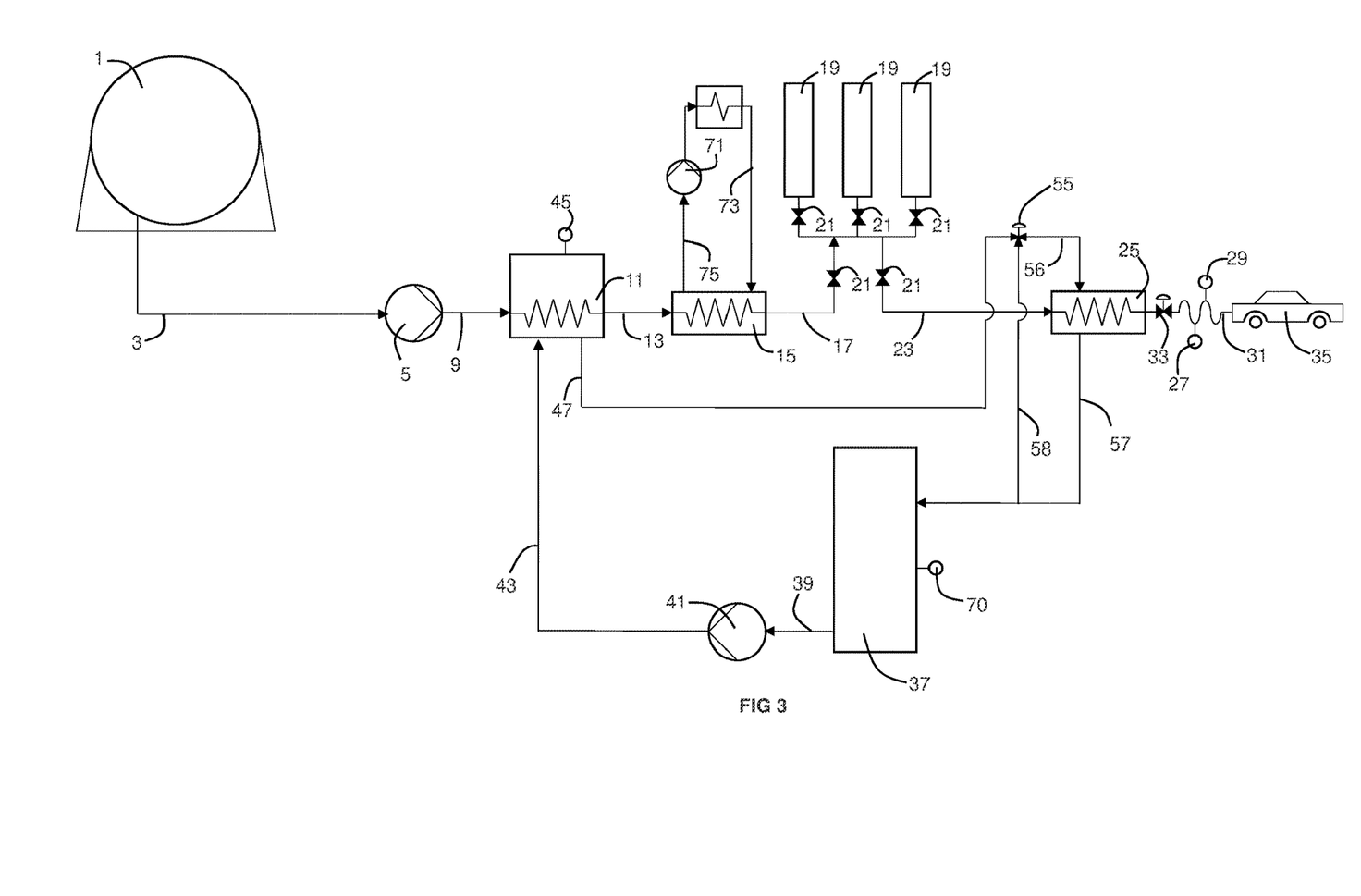
FIG. 3 is a schematic view of a variant of the station and method of FIG. 1.

As best shown in FIG. 3, if warming at the first heat exchanger 11 is insufficient to reach a desired temperature, the warmed pressurized stream of hydrogen 13 from the first heat exchanger 11 may be further warmed at an auxiliary heat exchanger 15. Stream 13 is fed to a warming circuit of auxiliary heat exchanger 15 to produce a further warmed stream of pressurized hydrogen 17 that is fed to the one or more buffer vessels 19 via the set of valves 21. Rowing through a cooling circuit of the auxiliary heat exchanger 15 is an auxiliary heat exchanger fluid (auxiliary HTF). The auxiliary HTF is pumped with an auxiliary HTF pump 49, warmed at a heater 51, fed to the cooling circuit of the auxiliary heat exchanger 15, and returned to the inlet of the auxiliary HTF pump 49. Non-limiting examples for the heater 51 include electrical heaters or radiators warmed by an ambient air fan such as that disclosed in WO 2021138169 A1). Operation of the auxiliary HTF pump 49 is controlled by a controller (such as a programmable logic controller or computer that is the same as or different from the one controlling the main HTF pump) based upon a temperature measured by temperature sensor 52 and a predetermined temperature set point or range of temperature set points. Temperature sensor 52 may measure a skin temperature of the auxiliary heat exchanger 15, a temperature of the auxiliary HTF inside the cooling circuit of the second heat exchanger 15, or a temperature of the auxiliary HTF at an outlet of the cooling circuit of the second heat exchanger 15. While the auxiliary heat exchanger may have any configuration known in the field of heat transfer involving cryogenic fluids, typically it is a tube-in-tube heat exchanger. The warming circuit is the inner tube which is concentrically disposed within an outer tube. The cooling circuit is formed by the annular space in between the inner and outer tubes.

Figure 4:
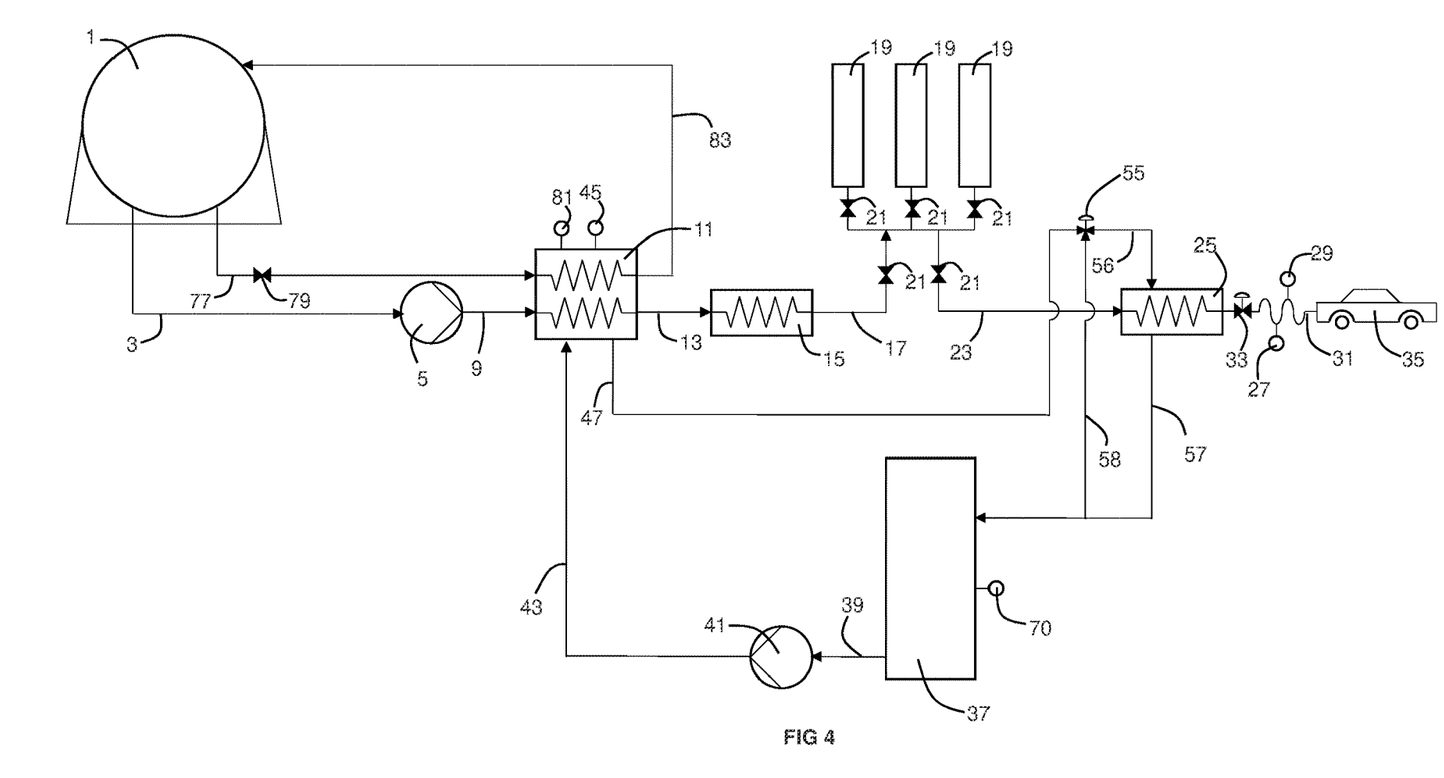
FIG. 4 is a schematic view of a variant of the station and method of FIG. 1.

As best illustrated in FIG. 4, at least part of a pressure building circuit for the storage vessel 1 extends through a second warming circuit of the first heat exchanger 11. A valve 79 may be opened to allow amounts of liquid hydrogen from the storage vessel 1 to flow to the second warming circuit via a pressure building circuit liquid hydrogen feed line 77. The liquid hydrogen is vaporized in the warming circuit and returned to a headspace of the storage vessel 11 via gaseous hydrogen line 83, thereby building pressure therein. This may be especially useful when the first heat exchanger 11 is a refrigeration hold-over medium as described above.

Figure 5:
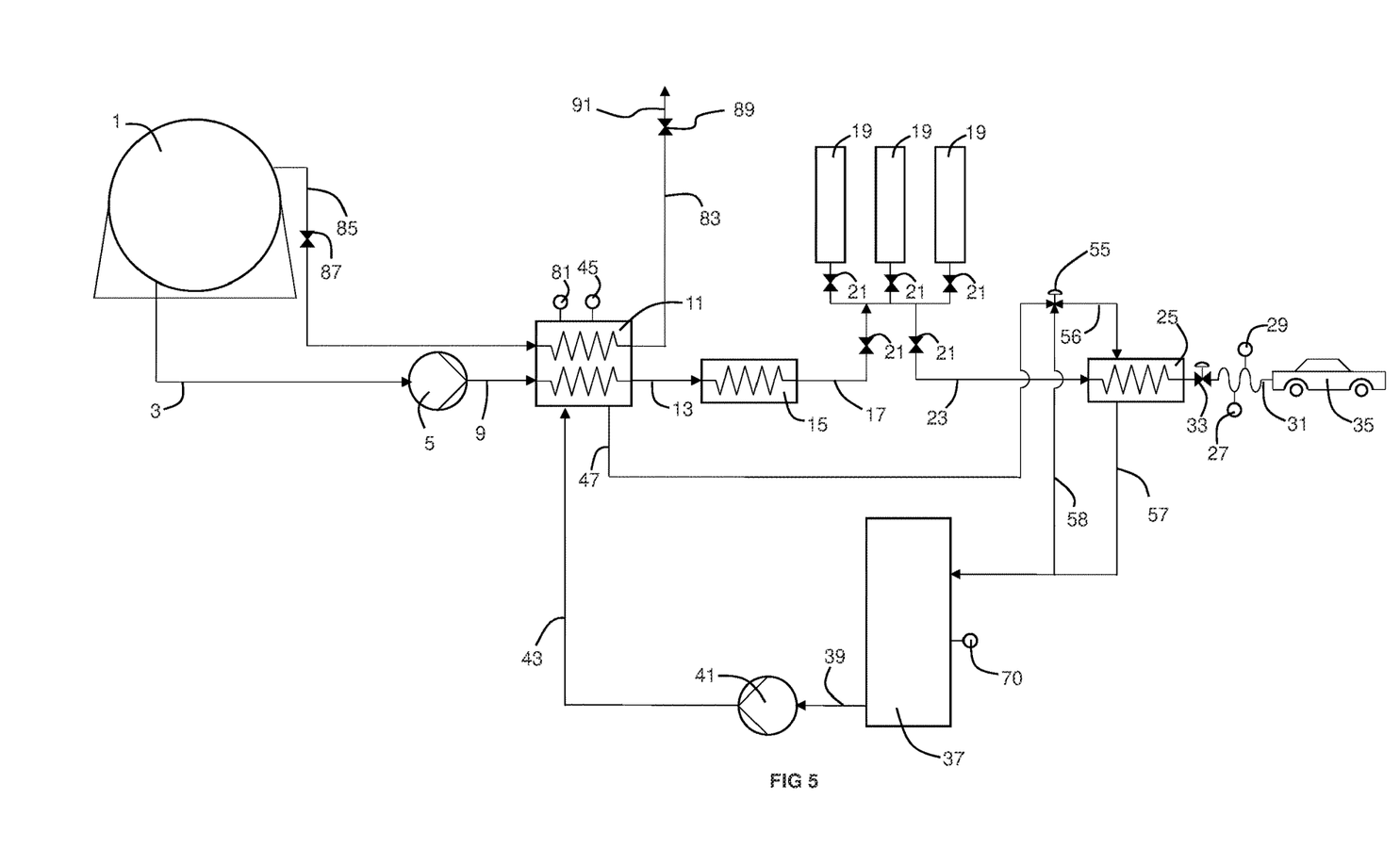
FIG. 5 is a schematic view of a variant of the station and method of FIG. 1.

As best shown in FIG. 5, at least part of a boil-off gas vent line for the storage vessel 1 extends through a second warming circuit of the first heat exchanger 11. A valve 87 and valve 89 may be opened to allow amounts of boil-off gas from the headspace of the storage vessel 1 to flow to the second warming circuit via a headspace feed line 85. The cold boil-off gas transfers frigories to the first heat exchanger 11 as it flows through the warming circuit and is subsequently vented to the ambient atmosphere via gaseous hydrogen line 83 and vent 91.

As best illustrated in FIG. 6, the pumped flow of main HTF 43 may be warmed through heat exchange with ambient air if the temperature of the main HTF is deemed too cold. Based upon a temperature measured by pressure sensor 81, a controller (such as a programmable logic controller or computer that is the same or different from the controller that controls the main HTF pump 41) controls 3-way flow control valves 95', 95". The 3-way flow control valves 95', 99" may be selectively opened to admit at least a portion of a flow of main HTF from main HTF bypass flow 97 and into a main HTF bypass loop 97 that includes a first end in downstream flow communication with the main HTF line 43 and a second end in upstream fluid communication with the main HTF 43. The relatively colder main HTF is warmed by a fan heater 99 that blows ambient air on a heat exchanger section of the fan heater 99. Typically, the fan heater is a fin-fan. A fin-fan is well-known as a type of heat exchanger that moves ambient air over finned tubes in which hot or cold (in comparison to ambient) fluid flows through. The thus-warmed main HTF is then allowed to flow to the cooling circuit of the first heat exchanger 11.

Figure 7:
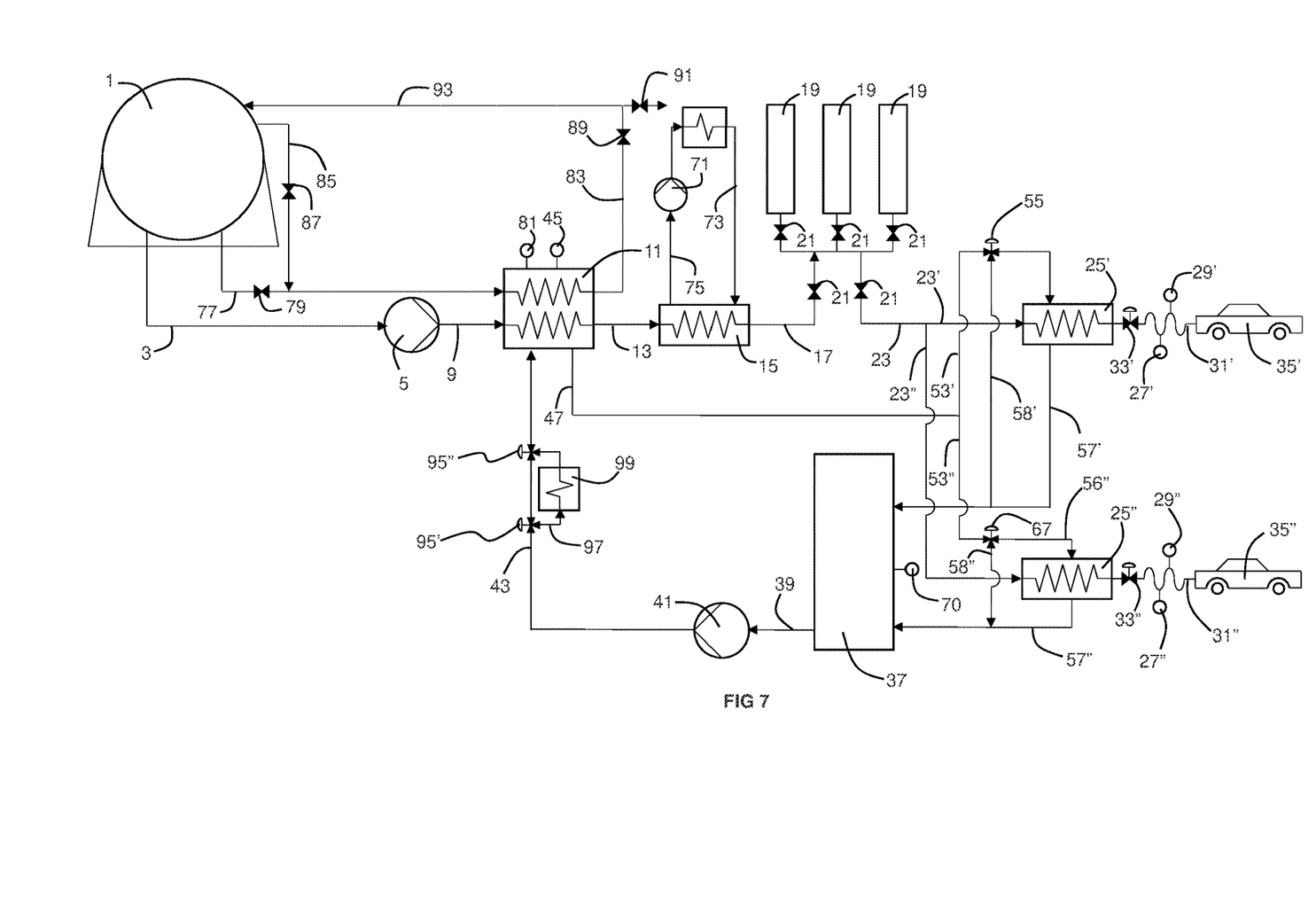
FIG. 7 is a schematic view of a combination of features of the stations and methods of FIGS. 2-6.

As best shown in FIG. 7, each of the features described in FIGS. 2-6 may be integrated into one system.

The invention provides several advantages.

Because the frigories of the liquid hydrogen recovered at the first heat exchanger are used to cool, at the second heat exchanger, the pressurized hydrogen used to fill the tank of the FCEV, the invention does not require an external source of refrigeration.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties; as well as for the specific information for which each is cited.

What is claimed is:

1. A system for filling tanks of fuel cell electric vehicles with pressurized hydrogen, comprising: a liquid hydrogen storage vessel; a liquid hydrogen pump; a main HTF surge vessel; a main heat transfer fluid pump; first and second heat exchangers; at least one buffer vessel; and a filling circuit, wherein:

said liquid hydrogen pump is in downstream flow communication from said storage vessel and is adapted and configured to receive a stream of liquid hydrogen from said storage vessel and pump and pressurize said liquid hydrogen stream to produce a stream of pressurized hydrogen;

said at least one buffer vessel is adapted and configured to receive the stream of pressurized hydrogen produced by said liquid hydrogen pump and store pressurized hydrogen until a vehicle tank fill is requested;

said filling circuit is in parallel downstream flow communication from said at least one buffer vessel, said filling circuit comprising at least one filling dispenser that is adapted and configured to engage with a fuel cell electric vehicle so as to allow a tank thereof be filled with pressurized hydrogen;

a heat exchange circuit is formed by, in flow order, said surge vessel, said main heat transfer fluid pump, said first heat exchanger, and said second heat exchanger, said first heat exchanger circuit being adapted and configured to circulate a main stream of a HTF from said surge vessel, through a cooling circuit of said first heat exchanger, through a warming circuit of said second heat exchanger, and back to said surge vessel;

said first heat exchanger is adapted and configured to heat, in a first warming circuit thereof, a pressurized stream of hydrogen from said liquid hydrogen pump and cool, in a cooling circuit thereof, the main HTF stream;

said second heat exchanger is adapted and configured to cool, in a cooling circuit thereof, a pressurized stream of hydrogen from said at least one buffer vessel, and heat, in a heating circuit thereof, the main HTF stream; and a boil-off gas venting circuit in flow communication between a headspace of said storage vessel and an ambient atmosphere of said system, said boil off gas venting circuit comprising a first end that is in downstream flow communication with said headspace, a second end that is selectively open to the ambient atmosphere, and a second warming circuit of said first heat exchanger in between said first and second ends, said boil off gas vent circuit being adapted and configured to receive boil off gas from said headspace, warm the received boil off gas in the second warming circuit through heat exchange with a mass of said first heat exchanger, and vent the warmed boil off gas to the ambient atmosphere via said second end.

2. The system of claim 1, said at least one filling dispenser comprises first and second filling dispensers, each one of which is adapted and configured to engage with a respective fuel cell electric vehicle so as to allow an associated tank thereof be filled with pressurized hydrogen, said filling circuit branching into a first split-stream adapted and configured to feed a pressurized stream of hydrogen from said at least one buffer vessel to said first filling dispenser, and a second split-stream adapted and configured to feed a pressurized stream of hydrogen from said at least one buffer vessel to said second filling dispenser.

3. The system of claim 1, further comprising an auxiliary heat transfer pump and an auxiliary heat exchanger that comprises a warming circuit that is in flow communication between said warming circuit of said first heat exchanger and said at least one buffer vessel and a cooling circuit, wherein:

an auxiliary heat transfer circuit is formed from said cooling circuit of said auxiliary heat exchanger and said auxiliary heat transfer pump;

said auxiliary heat transfer circuit is adapted and configured to circulate an auxiliary heat transfer fluid from said auxiliary heat transfer pump, through said cooling circuit of said auxiliary heat transfer circuit and back to said auxiliary heat transfer pump; and said auxiliary heat exchanger is a tube-in-tube heat exchanger comprising an inner tube concentrically disposed within an outer tube, said warming circuit of said auxiliary heat exchanger being said inner tube and said cooling circuit of said auxiliary heat exchanger being said outer tube.

4. The system of claim 1, further comprising a pressure building circuit in flow communication between a liquid hydrogen storage area of said storage vessel and a headspace of said storage vessel, said pressure building circuit being adapted and configured to receive a stream of liquid hydrogen from the liquid hydrogen space of said storage vessel, vaporize, in a second warming circuit of said first heat exchanger, the stream of liquid hydrogen received from said storage vessel through heat exchange with a mass of said first heat exchanger, and return the vaporized liquid hydrogen to said headspace so as to build a pressure therein.

5. The system of claim 1, further comprising:

a main HTF line in fluid communication between said main HTF pump and said cooling circuit of said first heat exchanger;

a main HTF bypass loop having a first end in downstream fluid communication with said main HTF line, a second end in upstream fluid communication with said main HTF line, and a heat exchanger section therebetween; and a fan heater adapted and configured to blow ambient air upon said heat exchange section to warm a pumped flow of the main HTF before the pumped flow of the main HTF is cooled at said first heat exchanger.

6. The system of claim 1, wherein said first heat exchanger comprises a mass of metal formed by high-temperature casting in liquid form around said warming and cooling circuits.

7. The system of claim 1, further comprising a pressure sensor and a temperature sensor each disposed in said filling circuit that are adapted and configured to measure a pressure and a temperature, respectively, of the cooled pressurized stream received from said second heat exchanger, a pressure control valve disposed in said filling circuit that is adapted and configured to control a pressure of the stream of cooled pressurized hydrogen used to fill a tank of a fuel cell electric vehicle, and a controller that is adapted and configured to control operation of said pressure control valve based upon the pressure and temperature measured by said pressure and temperature sensors.

8. A method for filling tanks of fuel cell electric vehicles with pressurized hydrogen, comprising the steps of:

providing the system of claim 1;

pumping a stream of liquid hydrogen from said storage vessel, with said liquid hydrogen pump, to produce a stream of pressurized hydrogen;

warming said stream of pressurized hydrogen in said warming circuit of said first heat exchanger to produce a warmed stream of pressurized hydrogen;

filling one or more of said at least one buffer vessel with said warmed stream of pressurized hydrogen;

pumping, with said main HTF pump, a stream of a main HTF from said surge vessel;

cooling said pumped stream of the main HTF in said cooling circuit of said first heat exchanger to produce a cooled stream of the main HTF;

warming said cooled stream of the main HTF in said warming circuit of said second heat exchanger to produce a warmed stream of the main HTF;

returning said warmed stream of the main HTF to said surge vessel;

in response to a request to fill a tank of a fuel cell electric vehicle with pressurized hydrogen, feeding a stream of pressurized hydrogen from said at least one buffer vessel to said second heat exchanger, cooling said fed stream of pressurized hydrogen in said cooling circuit of said second heat exchanger, and filling the tank;

feeding a stream of gaseous hydrogen from a headspace of said storage vessel to a second warming circuit of said first heat exchanger;

warming said fed stream of gaseous hydrogen in a second warming circuit of said first heat exchanger; and venting said warmed gaseous hydrogen to the ambient atmosphere.

9. The method of claim 8, wherein the system further comprises an auxiliary heat transfer pump and an auxiliary heat exchanger that comprises a warming circuit that is in flow communication between said warming circuit of said first heat exchanger and said at least one buffer vessel and a cooling circuit, the method further comprising the steps of:

pumping, with said auxiliary heat transfer pump, an auxiliary HTF in an auxiliary heat exchange circuit to produce a recirculating flow of said auxiliary HTF;

warming, in said warming circuit of said auxiliary heat exchanger, said stream of pressurized hydrogen from said first heat exchanger and cooling, in said cooling circuit of said auxiliary heat exchanger, said recirculating flow of said auxiliary HTF through heat exchange between said stream of pressurized hydrogen and said recirculating flow of said auxiliary HTF.

10. The method of claim 8, further comprising the steps of:

feeding a stream of liquid hydrogen from said storage vessel to a second warming circuit of said first heat exchanger;

vaporizing said fed stream of liquid hydrogen in said second warming circuit of said first heat exchanger through heat exchange with said first heat exchanger to produce a stream of vaporized liquid hydrogen;

returning said stream of vaporized liquid hydrogen to a headspace of said storage vessel thereby increasing a pressure thereof.

11. The method of claim 8, wherein:

said system further comprises: a main HTF line in fluid communication between said main HTF pump and said cooling circuit of said first heat exchanger; a main HTF bypass loop having a first end in downstream fluid communication with said main HTF line, a second end in upstream fluid communication with said main HTF line, and a heat exchanger section therebetween; and a fan heater adapted and configured to blow ambient air upon said heat exchange section to warm a pumped flow of the main HTF before the pumped flow of the main HTF is cooled at said first heat exchanger; and said method further comprises the step of warming at least a portion of the pumped stream of the main HTF in said heat exchanger section of said main HTF bypass loop by blowing ambient air upon said heat exchanger section with said fan heater.

12. The method of claim 8, wherein said system further comprises a controller, a pressure control valve disposed in said filling circuit that is adapted and configured to control a pressure of the stream of cooled pressurized hydrogen used to fill a tank of a fuel cell electric vehicle, and a pressure sensor and a temperature sensor disposed in said filling circuit that are adapted and configured to measure a pressure and a temperature, respectively, of the cooled pressurized stream received from said second heat exchanger, wherein said method further comprises the step of controlling, using said controller, operation of said pressure control valve based upon the pressure and temperature measured by said pressure and temperature sensors.

13. The method of claim 8, wherein said system further comprises an auxiliary heat exchanger adapted and configured to further warm, in a warming circuit thereof, the pressurized hydrogen exiting said first heat exchanger, said auxiliary heat exchanger being in flow communication between said first heat exchanger and said one or more buffer vessels, said method further comprising the step of warming the pressurized hydrogen exiting the first heat exchanger in said auxiliary heat exchanger through heat exchange with an auxiliary HTF flowing in an auxiliary heat exchanger circuit that includes a cooling circuit of said auxiliary heat exchanger.

* * * * *